United States Patent
Shantharam et al.

(10) Patent No.: US 10,235,373 B2
(45) Date of Patent: Mar. 19, 2019

(54) HASH-BASED FILE SYSTEM

(71) Applicant: VMWARE, INC., Palo Alto, CA (US)

(72) Inventors: Srinivasa Shantharam, Bangalore (IN); Pradeep Krishnamurthy, Bangalore (IN); Asit Desai, Palo Alto, CA (US); Prasanna Aithal, Bangalore (IN); Bryan Branstetter, Palo Alto, CA (US); Prasad Rao Jangam, Palo Alto, CA (US); Mahesh S Hiregoudar, Bangalore (IN); Raghavan Pichai, Bangalore (IN); Vivek Patidar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/630,983

(22) Filed: Jun. 23, 2017

(65) Prior Publication Data
US 2018/0260405 A1  Sep. 13, 2018

(30) Foreign Application Priority Data
Mar. 6, 2017 (IN) .............................. 201741007812

(51) Int. Cl.
*G06F 12/08* (2016.01)
*G06F 17/30* (2006.01)
*G06F 12/0873* (2016.01)
*G06F 9/455* (2018.01)

(52) U.S. Cl.
CPC .... *G06F 17/30097* (2013.01); *G06F 12/0873* (2013.01); *G06F 9/45533* (2013.01)

(58) Field of Classification Search
CPC ................ G06F 12/08; G06F 12/0873; G06F 17/30097; G06F 17/30; G06F 9/45533
USPC .................................................. 711/216, 207
See application file for complete search history.

(56) References Cited

U.S. PATENT DOCUMENTS

| | | | |
|---|---|---|---|
| 6,625,591 B1 * | 9/2003 | Vahalia | G06F 17/30097 |
| 2007/0244920 A1 * | 10/2007 | Palliyil | G06F 17/30949 |
| 2015/0242397 A1 * | 8/2015 | Zhuang | H04L 67/1097 |
| | | | 707/827 |
| 2017/0140165 A1 * | 5/2017 | Kaplan | G06F 21/6218 |
| 2018/0018342 A1 * | 1/2018 | Basrani | G06F 17/30097 |

* cited by examiner

*Primary Examiner* — Pierre Miche Bataille
(74) *Attorney, Agent, or Firm* — Loza & Loza, LLP

(57) ABSTRACT

System and method for executing a file system operation for a computer system utilize a computed hash value of a file system object to access a hash block of a file system directory stored in a storage system to locate a hash slot corresponding to the computed hash value. Using at least one of a hash pointer in the hash slot and an allocation block of the file system directory, a dirent slot in a dirent block of the file system directory is located to perform an operational task on the particular dirent slot to execute the file system operation.

20 Claims, 10 Drawing Sheets

HASH-BASED FILE SYSTEM

RELATED APPLICATIONS

Benefit is claimed under 35 U.S.C. 119(a)-(d) to Foreign Application Serial No. 201741007812 filed in India entitled "HASH-BASED FILE SYSTEM", on Mar. 6, 2017, by VMware, Inc., which is herein incorporated in its entirety by reference for all purposes.

BACKGROUND

Most file systems use hierarchical tree structure of directories to catalog data stored in storage media. Directories of a file system store references to all the files (and sometimes other directories) residing on the file system volume.

In a typical hierarchical tree structure of directories in a file system, a single directory stores references to all files/directories residing under that directory. The layout of a directory indicates how that directory stores information about files residing under it. Any access to files first start by looking up the file in the hierarchical tree structure starting from the file system's "root" directory or in a specific directory. The lookup operation typically involves disk accesses to go through the directory layout to search for the file. The performance efficiency of the lookup depends on the kind of layout the directory employs. As the number of files in a directory increases, the time needed to lookup a file typically also increases.

BRIEF DESCRIPTION OF THE DRAWINGS

Throughout the description, similar reference numbers may be used to identify similar elements.

DETAILED DESCRIPTION

Figure 1:
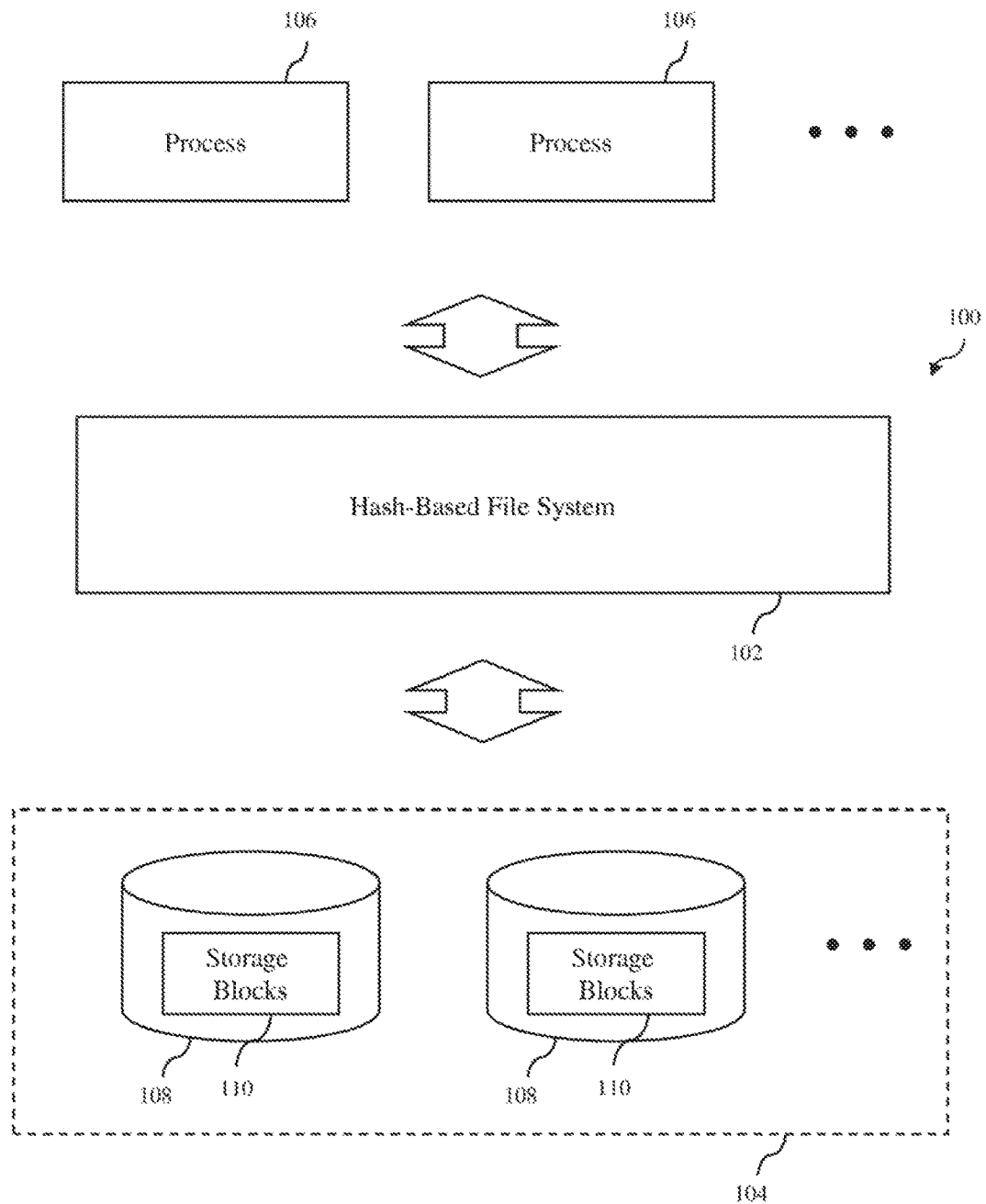
FIG. 1 is a block diagram of a computer system in accordance with an embodiment of the invention.

FIG. 1 depicts a computer system 100 with a hash-based file system 102 in accordance with an embodiment of the invention. The computer system is shown in FIG. 1 as including the hash-based file system 102 and a storage system 104. Other components of the computer system 100 that are commonly found in a conventional computer system, such as memory and one or more processors, are not shown in FIG. 1. The hash-based file system 102 allows processes 106, such as application processes, to execute file system operations to create, access and delete file system objects, such as files and directories/folders, being managed by the file system in an efficient manner.

The processes 106 can be any software processes that can run on the computer system 100, which can be a physical computer, a virtual computer, such as a VMware virtual machine, or a distributed computer system. The processes 106 may make requests for file system operations, which are executed by the file system 102. As explained below, information needed to execute the file system operations is stored in the storage system 104.

The storage system 104 includes of one or more computer data storage devices 108 which are used by the computer system 100 to store data. The data storage devices 108 can be any type of non-volatile storage devices that are commonly used for data storage. As an example, the data storage devices 108 may be, but not limited to, solid-state devices (SSDs), hard disks or a combination of the two. The storage space provided by the data storage devices 108 is divided into storage blocks 110, which may be disk blocks, disk sectors or other storage device sectors.

In an embodiment, the storage system 104 may be a local storage system of the computer system 100, such as hard drive disks in a personal computer system. In another embodiment, the storage system 104 may be a remote storage system that can be accessed via a network, such as a network-attached storage (NAS). In still another embodiment, the storage system may be a distributed storage system such as a storage area network (SAN) or a virtual SAN. Depending on the embodiment, the storage system 104 may include other components commonly found in those types of storage systems, such as network adapters, storage drivers and/or storage management servers. The storage system 104 may be scalable, and thus, the number of data storage devices 108 included in the storage system can be varied as needed to increase or decrease the capacity of the storage system to support increase or decrease in workload. Consequently, the exact number of data storage devices 108 included in the storage system 100 can vary from one to hundreds or more.

The hash-based file system 102 operates to manage one or more file system structures, which include hierarchies of file system objects, such as file system volumes, file directories/folders, and files, for shared use of the storage system 104. Thus, the file system 102 organizes the storage resources of the storage system 104 into the file system structures so that the processes 106 can access the file system objects for various file system operations, such as creating file system objects, deleting file system objects, and accessing file system objects.

The hash-based file system 102 maintains a file system directory stored in the storage system 104. The file system directory is used by the file system 102 to organize the file system objects being managed by the file system. Each file system object being managed by the file system 102 is associated with an entry in the file system directory that includes storage metadata of that file system object, such as the location of the file system object in the storage system 104. The entries of the file system objects are managed in the file system directory using hash values computed using names of the file system objects by the file system. Thus, as explained in detail below, computed hash values of file system object names are used to execute various file system operations using the file system directory.

Figure 2:
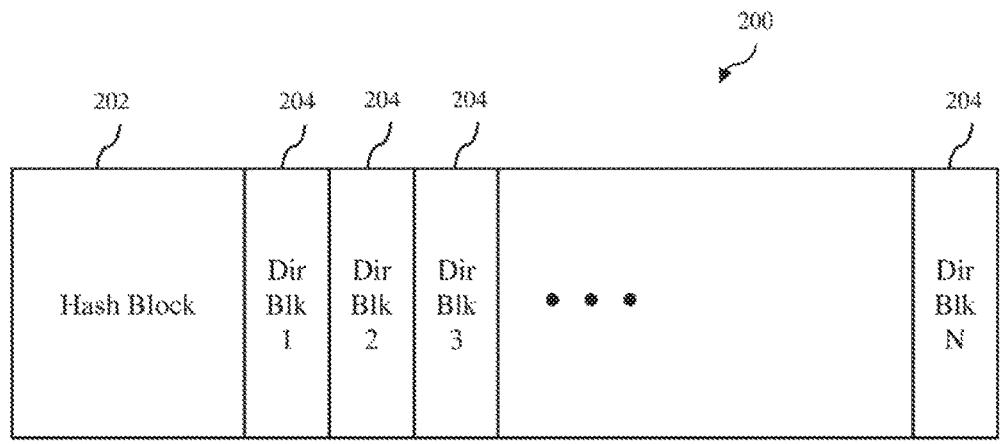
FIG. 2 illustrates a file system directory used by a hash-based file system of the computer system shown in FIG. 1 in accordance with an embodiment of the invention.

In FIG. 2, a file system directory 200 that is used by the hash-based file system 102 in accordance with an embodiment of the invention is shown. As illustrated in FIG. 2, the file system directory 200 includes a hash block 202 followed by one or more directory blocks 204. The hash block 202 includes information to locate specific dirents in the file system directory 200. The hash block 202 is described in more detail below. Each of the directory blocks 204 of the directory 200 can be an allocation map block, a dirent block or a link block. An allocation block describes all the directory blocks in the file system directory 200, and thus, can indicate the block type for each directory block and which directory blocks have free slots. A dirent block contains dirents, which describe the file system objects, such as directories and files, stored in the storage system 104. A link block contains link groups that indirectly address dirents for filenames that have collided to the same hash value. These different types of directory blocks are described in more detail below.

Figure 3:
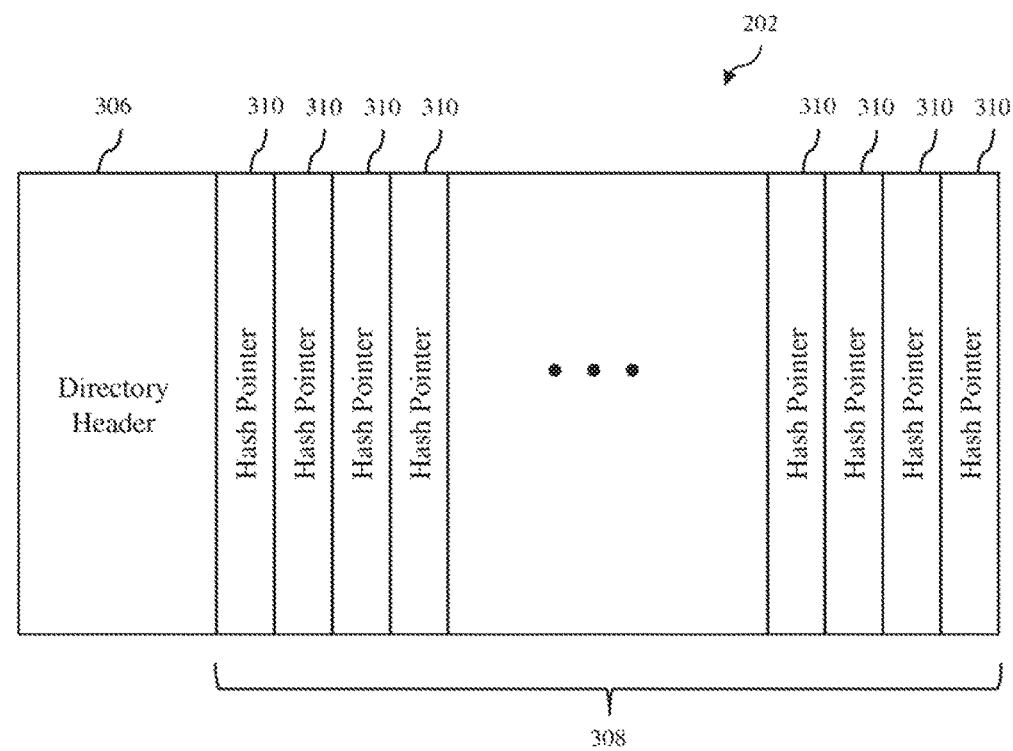
FIG. 3 illustrates a hash block of the file system directory shown in FIG. 2 in accordance with an embodiment of the invention.

Turning now to FIG. 3, the hash block 202 of the file system directory 200 in accordance with an embodiment of the invention is shown. The hash block 202 is the first data block of the file system directory 200. In a particular implementation, the hash block 202 is the first 64 kilobyte (kb) block of the directory 200. The hash block 202 includes a directory header 306 and a hash space 308, which includes a number of hash pointers 310 in slots of the hash space. The directory header 306 contains data that describes the directory layout. The directory header 306 may contain information such as, but not limited to, version identification, number of files, maximum number of files, allocation map blocks, and checksum. The version identification is used for versioning any on-disk changes made to the directory layout. The number of files indicates the number of files currently present in the file system directory 200. The maximum number of files indicates the maximum number of files to which the file system directory 200 has grown. As an example, the maximum number of files may be used for statistics. The allocation map blocks information is used to keep track of how many allocation map blocks are in the directory and their locations. The allocation map blocks information may be maintained as an array. The checksum it is used to ensure the integrity of the directory header 306 of the hash block 202.

In a particular implementation, the size of the directory header 306 may be 1,532 bytes. The hash pointers 310 in the hash space 308 point towards the locations of dirents in the file system directory 200. The hash pointers 310 can either directly point to dirents (within dirent blocks) or to link groups (within link blocks). Each hash pointer 310 may include, but not limited to, block type, block number and slot number. The block type identifies whether a block is a dirent, link or allocation block. The block number identifies the location of the block. The slot number identifies the specific slot within the identified block. In a particular implementation, each hash pointer is 4 bytes in size, and the hash space 308 may hold up to 16,000 hash pointers.

Following the hash block 204, the file system directory 200 includes one or more directory blocks 204, as shown in FIG. 2. As noted above, each directory block 204 can be an allocation map block, a link block or a dirent block. An allocation map block may be a bitmap that describes all the directory blocks in a file system directory. A link block houses link groups containing locations of dirents in hash collision chains. These locations are used to indirectly address the locations of dirents from the hash space 308. A dirent block houses dirents, which describe the file system objects stored in the storage system 104.

Figure 4:
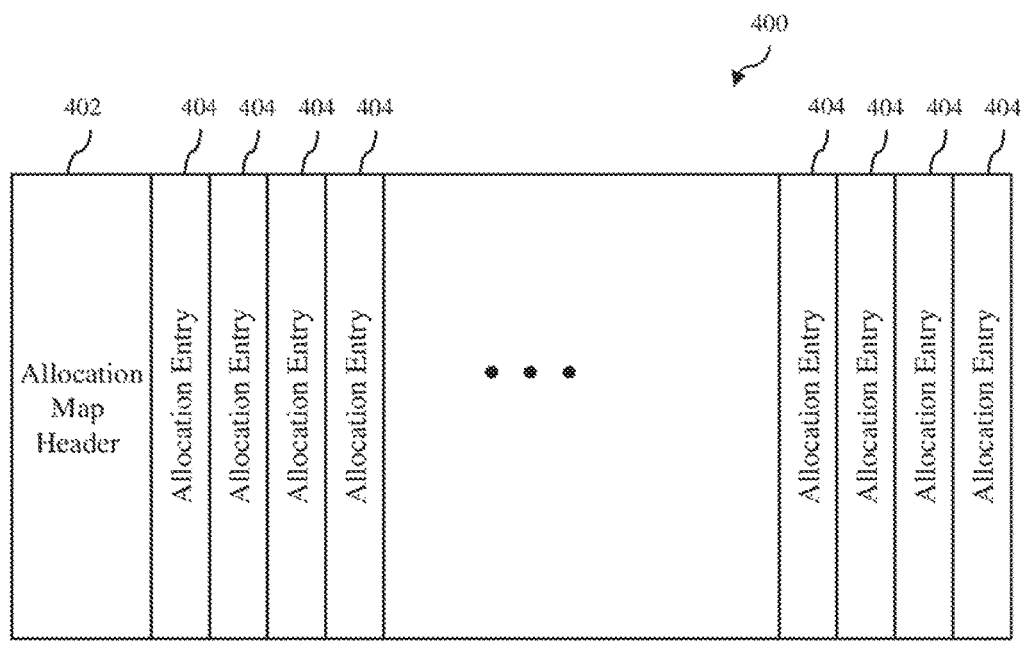
FIG. 4 illustrates an allocation block of the file system directory shown in FIG. 2 in accordance with an embodiment of the invention.

Turning now to FIG. 4, an allocation map block 400 in accordance with an embodiment of the invention is shown. The allocation map block 400 includes an allocation map block header 402 followed by allocation entries 404 in slots. The allocation map block header 402 may contain information such as, but not limited to, version identification, block type, total number of slots, number of free slots, bitmap and checksum. The version identification is used for versioning any on-disk changes made to the directory layout. The block type indicates that this block is an allocation map block. The total number of slots indicates the total number of slots for allocation entries present in this block. The number of free slots indicates how many of the slots in the block are free. The bitmap indicates which of the slots present in the block are in-use and which slots are free using one bit for each of the slots in the block. The checksum information is used to ensure the integrity of the allocation map block 400.

Each allocation entry 404 in the allocation map block 400 describes a particular directory block. Thus, there is a unique allocation entry for each directory block 204 of the file system directory 200 in the allocation map blocks in the file directory, such as the allocation map block 400. Consequently, the allocation entries of allocation map blocks, such as the allocation map block 400, can be viewed as descriptors for the whole file system directory 200, indicating, for example, which directory blocks 204 are used for dirents and which directory blocks 204 are used for link groups. The allocation entries 404 contain information that helps to locate a block of a particular type that has at least one free slot. Each allocation entry includes block type information, initialized block information and free slot information. The block type information identifies the type of block for the corresponding directory block. The initialized block information indicates whether the corresponding directory block is initialized or not. The free slot information indicates whether the corresponding directory block has at least one free slot. The actual number of free slots in each directory block is identified in the header of that block. In a particular embodiment, each allocation entry is 4 bytes in size, and the allocation map block 400 can support 8064 allocation entries.

In an embodiment, the first allocation map block of the file system directory 200 is situated immediately to the right of the hash block 204 and is initialized at the time of directory creation. Additional allocation map blocks are allocated and initialized as needed. The locations of all the allocation map blocks are stored in an array in the directory header 306 of the hash block 204.

Figure 5A:
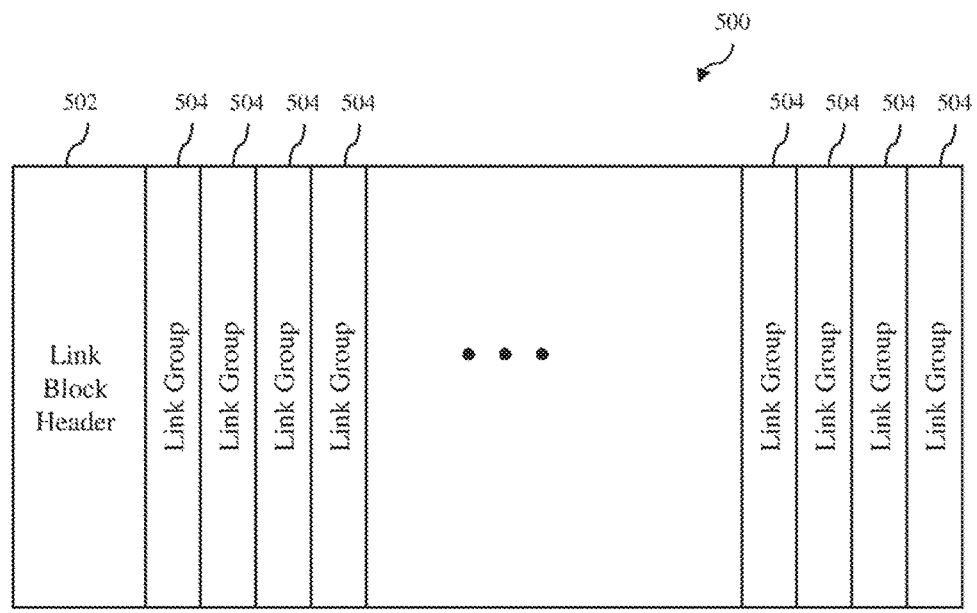
FIG. 5A illustrates a link block of the file system directory shown in FIG. 2 in accordance with an embodiment of the invention.

Turning now to FIG. 5A, a link block 500 in accordance with an embodiment of the invention is shown. The link block 500 includes a link block header 502 followed by link groups 504 in slots. Similar to the allocation block header 402, the link block header 502 may contain information such as, but not limited to, version identification, block type, total number of slots, number of free slots, bitmap and checksum. Each link group 504 includes the locations of dirents that collided to the same hash value. In a particular implementation, the link block header is 64 bytes in size and each link group is 84 bytes in size. In this implementation, the link block can support 48 link groups in a volume with 4 kilobytes (kB) disk sector size.

Figure 5B:
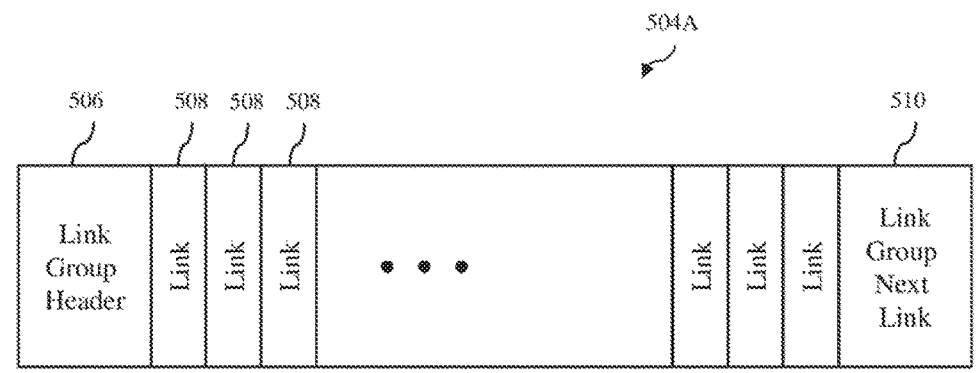
FIG. 5B illustrates a link group of the link block shown in FIG. 5A in accordance with an embodiment of the invention.

Turning now to FIG. 5B, a link group 504A for a filename collision in accordance with an embodiment of the invention is shown. The link group 504A is an example of the link groups 504 in the link group block 500. The link group 504A includes a link group header 506 followed by links 508 in slots, which are followed by a link group next link 510. The link group header 506 may contain information such as, but not limited to, a predetermined portion of the hash value for the filename involved in this filename collision, number of total links, number of free links and index to the next free link. The predetermined portion of the hash value is used to identify the collision chain associated with the link group 504A. In a particular implementation, the predetermined portion of the hash value is the lower 16 bits of the 32-bit hash value for the filename, i.e., the last 16 bits of the 32-bit hash value for the filename. The total number of links indicates the total number of links present in this link group. The number of free links indicates the number of free links present in this link group. The index to the next free link identifies the next free link that can be used for the collision chain associated with this link group.

Each link 508 in the link group 504A contains an identification portion of the hash value for the filename involved in this filename collision and a dirent pointer. The identification portion of the hash value in each link is a different portion of the hash value than the predetermined portion of the hash value in the link group header 506. In a particular implementation, the identification portion of the hash value in each link is the upper 16 bits of the hash value for the filename, i.e., the first 16 bits of the 32-bit hash. value for the filename. The identification portion of the hash value in each link is used to match the hash value of the filename involved in the collision with a corresponding link. Similar to the hash pointers 310, the dirent pointer of each link 508 may include, but not limited to, block type, block number and slot number. The block type identifies whether a block is a dirent, link or allocation block. For a dirent pointer, the block type would indicate that the block is a dirent block. The block number identifies the location of the block. The slot number identifies the specific slot within the identified block. The dirent pointers of the links 508 may be stored as an array. In a particular implementation, each dirent pointer is 4 bytes in size, and thus, each link is 6 bytes in size. In addition, each link group may hold 12 links.

The link group next link 510 identifies the next link group in the same collision chain. When all the available link in the link group 504A have been used, i.e., filled with dirent pointers, the link group next link 510 is used to provide more links for the same collision chain, which means that more files have collided to the same hash value than can be addressed in one link group.

Figure 6:
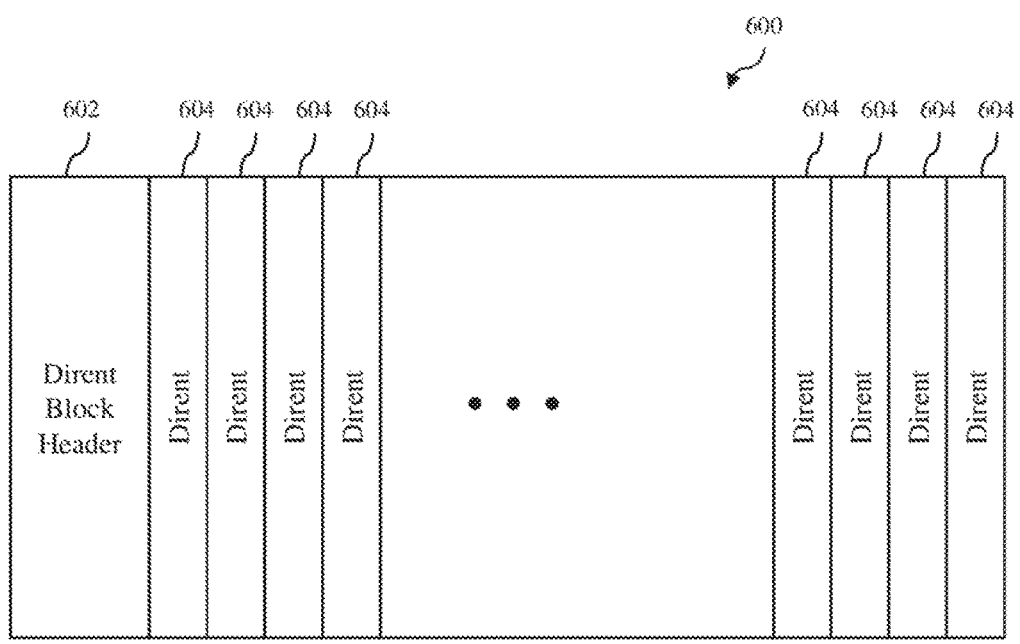
FIG. 6 illustrates a dirent block of the file system directory shown in FIG. 2 in accordance with an embodiment of the invention.

Turning now to FIG. 6, a dirent block 600 in accordance with an embodiment of the invention is shown. The dirent block 600 includes a dirent block header 602 followed by a number of dirents 604 in slots. Similar to the allocation block header 402 and the link block header 502, the dirent block header 502 may contain information such as, but not limited to, version identification, block type, total number of slots, number of free slots, bitmap and checksum. Each dirent 604 may contain information such as, but not limited to, file type, address of the file descriptor, the complete hash value, filename and offset within the parent directory where this dirent is located. The file type indicates whether the file system object associated with the dirent is a directory, regular file, etc. The address of the file descriptor is the storage address of the storage device where the blocks allocated to the file are located. In a particular implementation, the complete hash value is a 32-bit hash value for the associated file. Thus, each dirent 604 contains all the information to create, access and delete a file system object, such as a directory or a file. In a particular implementation, the dirent header is 64 bytes in size and each dirent is 288 bytes in size. In addition, each dirent block may hold 14 dirents.

Figure 7:
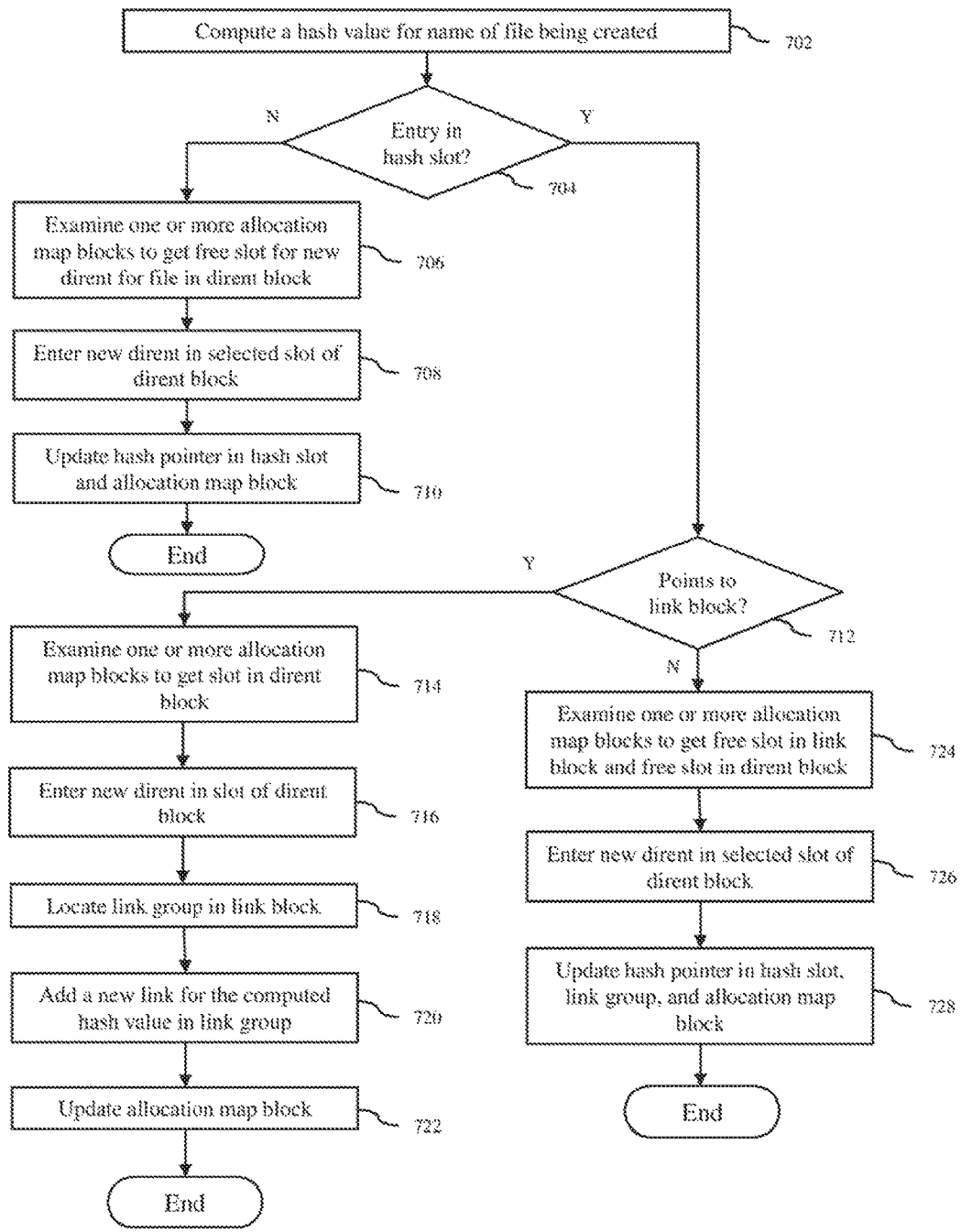
FIG. 7 is a process flow diagram of a process of creating a file system object in accordance with an embodiment of the invention.

A process of creating a file system object in accordance with an embodiment of the invention is described with reference to a process flow diagram of FIG. 7. In this description, the file system object being created is a file. However, the process is similar for creating other file system objects, such as directories or file folders.

At step 702, a hash value is computed by the file system 102 for the name of the file being created using a hash function. Next, at step 704, the hash space 308 of the hash block 202 is checked to see if there is an entry in the hash slot corresponding to the computed hash value. If there is no entry in the hash slot, then there is no collision between the computed hash value and any of the previous hash values. If there is already an entry in the bash slot, then there is a collision between the computed hash value and one or more of the previous hash values. In a particular implementation, the computed hash value is a 32-bit hash value and the lower 16-bits of the 32-bit hash value, i.e., the last 16 bits of the hash value, is used to determine the corresponding hash slot by the file system 102.

If there is no entry in the hash slot (i.e., no collision), one or more allocation map blocks are examined by the file system 102 to get a free slot for a new dirent in a dirent block for the file being created, at step 706. Next, at step 708, the new dirent is entered in the slot of the dirent block by the file system. Next, at step 710, the hash slot corresponding to the compute hash value and an allocation map block for the dirent block are updated. In particular, a hash pointer pointing to the slot of the dirent block where the new dirent has been added is added to the hash slot. In addition, the allocation map block that includes an entry for that dirent block is updated to reflect that the slot for the new dirent in the dirent block is now occupied, i.e., not free. The process then comes to an end.

If there is an entry in the hash slot (i.e., collision), the entry in the hash slot, which is a hash pointer, is checked by the file system 102 to see if the hash pointer points to a slot in a dirent block or a slot in a link block of the file system directory. If the hash pointer points to a link block, then the process proceeds to step 714, where one or more allocation map blocks of the file system directory are examined by the file system to get a free slot in a dirent block for the file. Next, at step 716, the new dirent for the file is entered in the slot of the dirent block by the file system. Next, at step 718, the link group in the link block specified by the hash pointer is located. Next, at step 720, a new link for the computed hash value is added in the link group to increase the collision chain defined in the link group. The new link includes a dirent pointer that points to the dirent slot where the new dirent has been entered. Next, at step 722, the allocation map block may be updated accordingly. In particular, the allocation map block may be updated if a previously unused dirent block is initialized to get the free slot in the dirent block for the file. The process then comes to an end.

If the hash pointer does not point to a link block (i.e., points to a dirent block), then the process proceeds to step 724, where one or more allocation map blocks of the file system directory are examined by the file system to get a free slot in a link block for a new collision chain and a free slot in a dirent block for the file. Next, at step 726, the new dirent for the file is entered in the slot of the dirent block by the file system. Next, at step 728, the hash slot corresponding to the compute hash value, the link block for the new collision chain and an allocation map block for the dirent block are updated. In particular, a new link group in the link block is created with link entries for the computed hash value and the previous hash value corresponding to the same hash slot. The link entry for the computed hash value includes a dirent pointer that points to the slot where the new dirent was added. The link entry for the previous hash value includes a dirent pointer that points to the slot where the dirent for the previous hash value is stored, which is similar to the current hash pointer in the hash slot corresponding to the computed hash value. In addition, the hash pointer in the hash slot corresponding to the computed hash value is updated to point to the slot in the link block where the new link group was added. Lastly, the allocation map block may be updated if a previously unused allocation map block is initialized to get the free slot in the dirent block for the file. The process then comes to an end.

Figure 8:
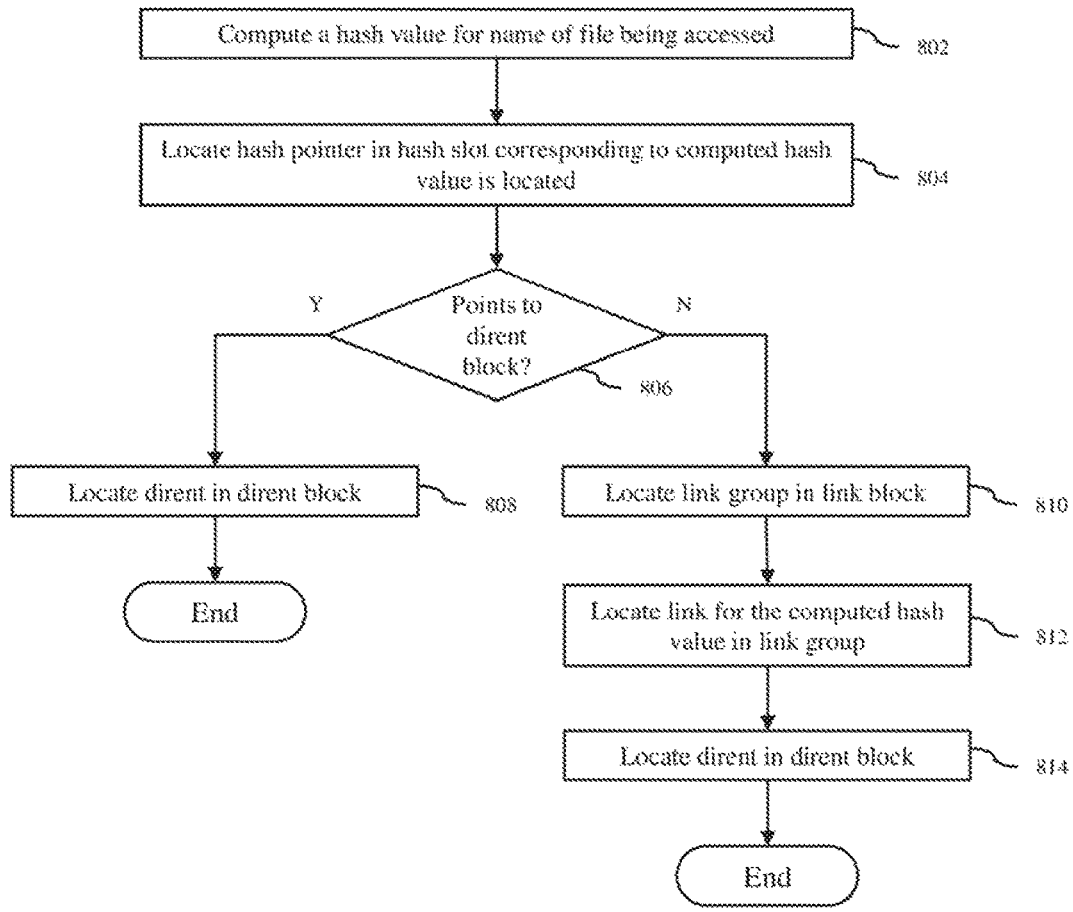
FIG. 8 is a process flow diagram of a process of accessing a file system object in accordance with an embodiment of the invention.

A process of accessing a file system object in accordance with an embodiment of the invention is described with reference to a process flow diagram of FIG. 8. In this description, the file system object being accessed is a file. However, the process is similar for accessing other file system objects, such as directories or file folders.

At step 802, a hash value is computed by the file system for the name of the file being accessed using a hash function. Next, at step 804, the hash pointer in the hash slot corresponding to the computed hash value is located in the hash space 308 of the hash block 202 by the file system 102. Next, at step 806, a determination is made whether the hash pointer points to a dirent block.

If the hash pointer points to a dirent block, the process proceeds to step 808, where the dirent is located by the file system 102 in the dirent block as specified in the hash pointer. The dirent is then used to access the file stored in the storage system 104. The process then comes to an end.

If the hash pointer does not point to a dirent block, i.e., points to a link block, the process proceeds to step 810, where a link group is located in the link block as specified in the hash pointer. Next, at step 812, a link for the computed hash value is found in the link group by the file system 102. In an embodiment, the link is located using the lower 16 bits of the hash value. Next, at step 814 the dirent for the file is located by the file system 102 in the dirent block as specified in the dirent pointer of the link. The dirent is then used to access the file stored in the storage system 104. The process then comes to an end.

Figure 9:
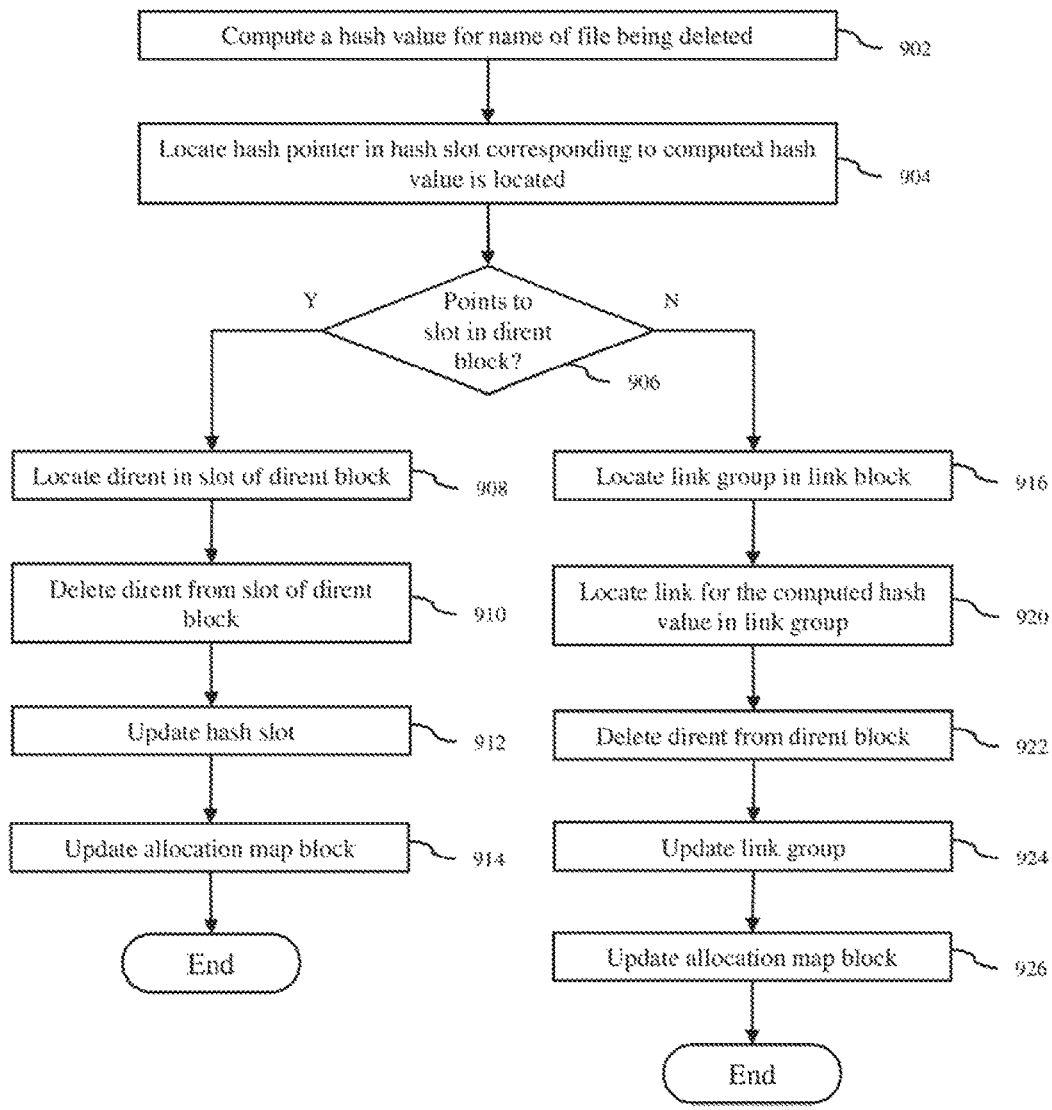
FIG. 9 is a process flow diagram of a process of deleting a file system object in accordance with an embodiment of the invention.

A process of deleting a file system object in accordance with an embodiment of the invention is described with reference to a process flow diagram of FIG. 9. In this description, the file system object being deleted is a file. However, the process is similar for deleting other file system objects, such as directories or file folders.

At step 902, a hash value is computed by the file system for the name of the file being deleted using a hash function. Next, at step 904, the hash pointer in the hash slot corresponding to the computed hash value is located in the hash space 308 of the hash block 202 by the file system 102. Next, at step 906, a determination is made whether the hash pointer points to a dirent block.

If the hash pointer points to a dirent block, the process proceeds to step 908, where the dirent is located by the file system 102 in the dirent block as specified in the hash pointer. Next, at step 910, the dirent is deleted from the dirent block. Next, at step 912, the hash slot corresponding to the computed hash value is adjusted to reflect the deleted dirent. In an embodiment, the hash pointer in the hash slot is deleted. Next, at step 914, the allocation map block with an entry for the dirent block may be updated if the dirent block goes from being full to having at least one free slot due to the dirent for the file being deleted from the dirent block. The process then comes to an end.

If the hash pointer does not point to a dirent block, i.e., points to a link block, the process proceeds to step 916, where a link group is located in the link block as specified in the hash pointer. Next, at step 918, a link for the computed hash value is found in the link group by the file system 102. In an embodiment, the link is located using the lower 16 bits of the hash value. Next, at step 920, the dirent for the file is located by the file system 102 in the dirent block as specified in the dirent pointer of the link. Next, at step 922, the dirent is deleted from the dirent block. Next, at step 924, the collision chain in the link group is adjusted accordingly. As an example, the link for the computed hash value in the link group may be deleted. Next, at step 926 the allocation entry may be updated if the dirent block goes from being full to having at least one free slot due to the dirent for the file being deleted from the dirent block. The process then comes to an end.

In some embodiments, the hash-based file system 102 may uses a cache to store frequently used blocks, such as the hash block, to reduce the number of times the file system has to access the storage system 104 when looking up various files within the satire directory.

Figure 10:
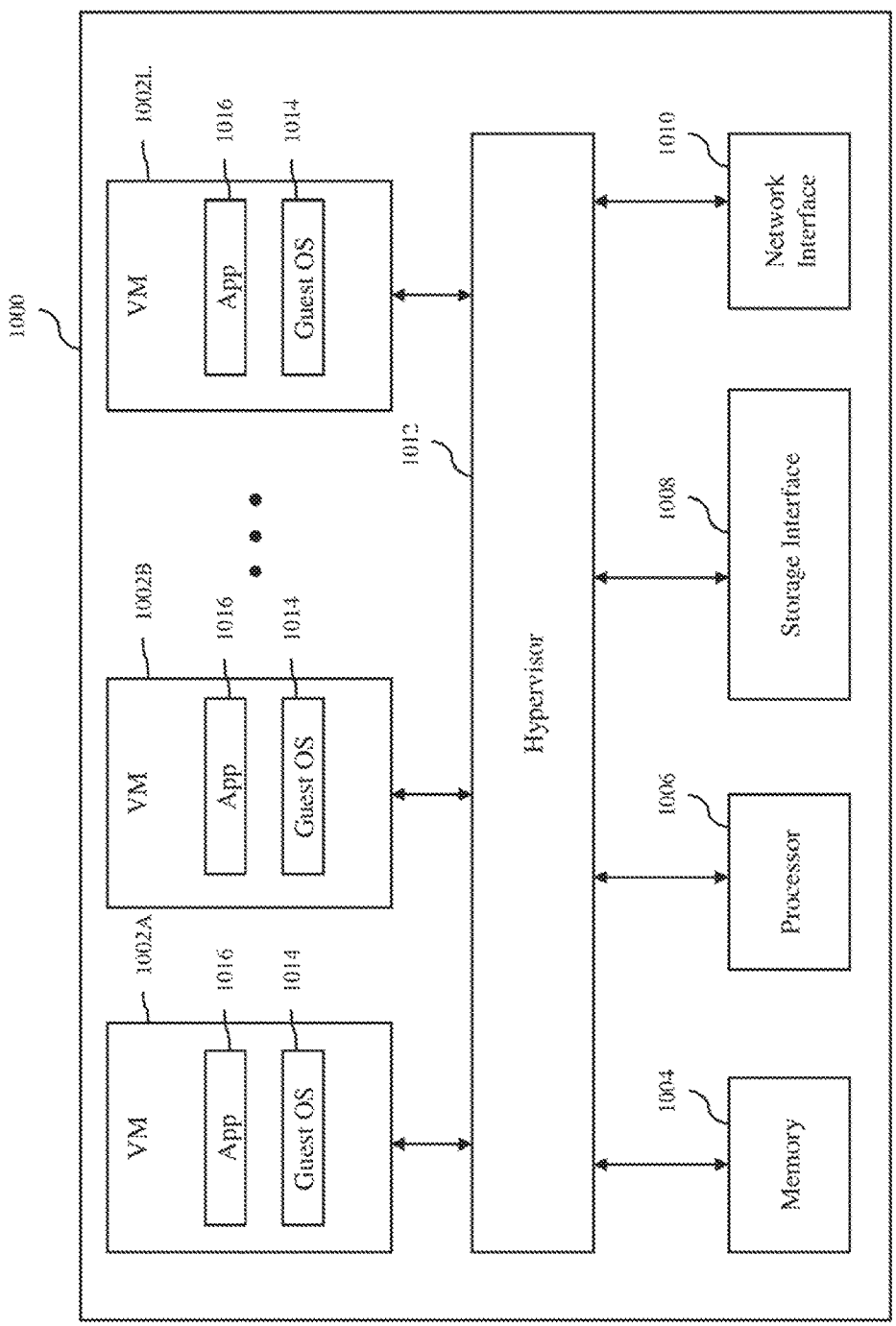
FIG. 10 is a block diagram of a physical computer system with a number of virtual machines in which the hash-based file system in accordance with an embodiment of the invention may be implemented.

The file system 102 is typically part of an operating system (OS) of a computer system, which may be a physical computer system, such as a physical server, or a virtual computer system, such as a virtual machine. Turning now to FIG. 10, a physical computer system 1000 in which the file system 102 may be implemented is shown. In FIG. 10, the physical connections between the various components of the computer system 1000 are not illustrated. As shown in FIG. 10, the physical computer system 1000 is configured to support a number of virtual machines (VMs) 1002A, 1002B ... 1002L (where L is a positive integer). The number of VMs supported by the physical computer system 1000 can be anywhere from one to more than one hundred. The exact number of VMs supported by the physical computer system 1000 is only limited by the physical resources of the physical computer system. The VMs share at least some of the hardware resources of the physical computer system 1000, which include one or more system memories 1004, one or more processors 1006, a storage interface 1008 and a network interface 1010. Each system memory 1004, which may be random access memory (RAM), is the volatile memory of the physical computer system. Each processor 1006 can be any type of a processor, such as a central processing unit (CPU) commonly found in a personal computer. The storage interface 1008 is an interface that allows that physical computer system 1000 to communicate with one or more physical storage systems. As an example, the storage interface 1008 may be a host bus adapter or a network file system interface. The network interface 1010 is an interface that allows the physical computer system to communicate with other devices through one or more computer networks. As an example, the network interface 1010 may be a network adapter.

In the illustrated embodiment, the VMs 1002A, 1002B . . . 1002L run on "top" of a hypervisor 1012, which is a software interface layer that, using virtualization technology, enables sharing of the hardware resources of the physical computer system 1000 by the VMs. However, in other embodiments, one or more of the VMs can be nested, i.e., a VM running in another VM. Any computer virtualization architecture can be implemented. For example, the hypervisor 1012 may run on top of the operating system (OS) of the physical computer system 1000 or directly on hardware of the physical computer system. With the support of the hypervisor 1012, the VMs provide isolated execution spaces for guest software. Each VM may include a guest operating system (OS) 1014, one or more guest applications 1016. The guest OS 1014 manages virtual system resources made available to the corresponding VM by the hypervisor 1012, and, among other things, the guest OS forms a software platform on top of which the guest applications 1016 run.

The file system 102 may be implemented in one or more of the VMs 1002A, 1002B . . . 1002L running in the physical computer system 1000 as part of their OS, i.e., the guest OS 1014. Thus, in this implementation, the file system 102 allows processes, which may be executed by the guest applications 1016, to access physical storage systems available to the physical computer system 1000. The file system 102 may also be implemented in the physical computer system 1000 as part of the host OS. Thus, the file system 1000 may be implemented in the OS of any physical or virtual computer system.

Figure 11:
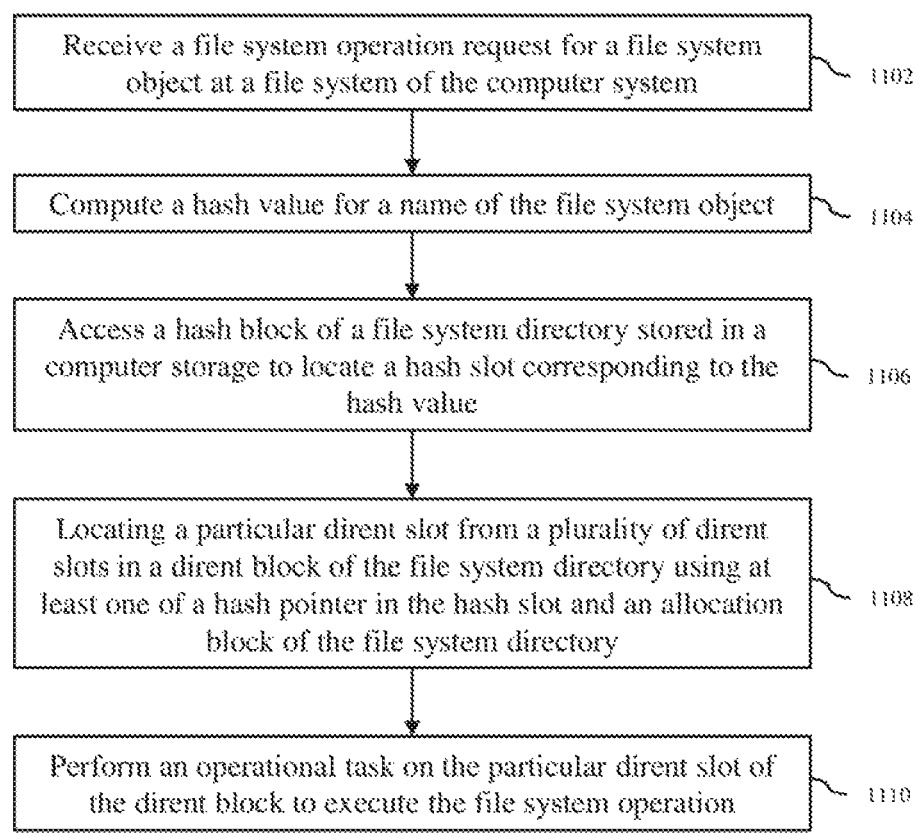
FIG. 11 is a flow diagram of a method for checking and characterizing metadata of snapshots in accordance with an embodiment of the invention.

A method for executing a file system operation for a computer system in accordance with an embodiment of the invention is now described with reference to the process flow diagram of FIG. 11. At step 1102, a file system operation request for a file system object is received at a file system of the computer system. Next, at step 1104, a hash value is computed for a name of the file system object. Next, at step 1106, a hash block of a file system directory stored in a storage system is accessed to locate a hash slot corresponding to the hash value. Next, at step 1108, a particular dirent slot is located from a plurality of dirent slots in a dirent block of the file system directory using at least one of a hash pointer in the hash slot and an allocation block of the file system directory that includes information to locate the particular dirent slot, where the dirent slots are used to store dirents that contain storage information of file system objects stored in the storage system. Next, at step 1110, an operational task is performed on the particular dirent slot of the dirent block to execute the file system operation.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment oldie resent invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM) a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for executing a file system operation for a computer system wherein the computer system includes memory and a processor and the processor executes the method, the method comprising:
   receiving a file system operation request for a file system object at a file system of the computer system;
   computing a hash value for a name of the file system object;
   accessing a hash block of a file system directory stored in a storage system to locate a hash slot corresponding to the hash value;
   locating a particular dirent slot from a plurality of dirent slots in a dirent block of the file system directory using at least one of a hash pointer in the hash slot and an allocation block of the file system directory that includes information to locate the particular dirent slot, the dirent slots being used to store dirents that contain storage information of file system objects stored in the storage system; and
   performing an operational task on the particular dirent slot of the dirent block to execute the file system operation.

2. The method of claim 1, further comprising associating the hash slot with the computed hash value using a portion of the computed hash value.

3. The method of claim 1, wherein performing the operational task includes:
   adding a new dirent into the particular dirent slot to create the file system object, the new dirent containing storage information of the file system object; and
   updating the hash slot with a new hash pointer pointing to the particular dirent slot.

4. The method of claim 3, further comprising:
   if the hash slot has no entry, accessing the allocation block of the file system directory to locate the particular dirent slot, the allocation block including allocation entries that includes information regarding different blocks in the file system directory and any free slots in the different blocks;
   after the new dirent has been added to the particular dirent slot, adding a new hash pointer to the hash block to point to the particular dirent slot.

5. The method of claim 3, further comprising:
   if the hash slot has an entry pointing to a dirent slot, accessing the allocation block of the file system directory to locate a link group of a link block of the file system directory for the computed hash value;
   updating the hash pointer in the hash slot to point to the link group;
   adding links in the link group with dirent pointers that point to the dirent slot and to the particular dirent slot.

6. The method of claim 3, further comprising:
   if the hash slot has an entry pointing to a link group of a link block of the file system directory, adding a new link to the link group with a dirent pointer that points to the particular dirent slot.

7. The method of claim 1, wherein performing the operational task includes reading a dirent in the particular dirent slot to access the file system object stored in the storage system, the dirent containing storage information of the file system object.

8. The method of claim 7, further comprising locating a dirent pointer in a link group of a link block of the file system directory that points to the particular dirent slot using the hash pointer in the hash slot of the hash block, the link group including dirent pointers for hash values that are associated with the same hash slot.

9. The method of claim 1, wherein performing the operational task includes deleting a dirent in the particular dirent slot to delete the file system object, the dirent containing storage information of the file system object.

10. The method of claim 9, further comprising:
    locating a dirent pointer in a link group of a link group block of the file system directory that points to the particular dirent slot using the hash pointer in the hash slot of the hash block, the link group including dirent pointers for hash values that are associated with the same hash slot; and
    after the dirent has been deleted from the particular dirent slot, removing the dirent pointer from the link group of the link group block.

11. A system comprising:
    memory; and
    a processor configured to:
    receive a file system operation request for a file system object at a file system of the computer system;
    compute a hash value for a name of the file system object;
    access a hash block of a file system directory stored in a storage system to locate a hash slot corresponding to the hash value;
    locate a particular dirent slot from a plurality of dirent slots in a dirent block of the file system directory using at least one of a hash pointer in the hash slot and an allocation block of the file system directory that includes information to locate the particular dirent slot, the dirent slots being used to store dirents that contain storage information of file system objects stored in the storage system; and
    perform an operational task on the particular dirent slot of the dirent block to execute the file system operation.

12. The system of 11, wherein the processor is further configured to:
    locate a dirent pointer in a link group of a link group block of the file system directory that points to the particular dirent slot using the hash pointer in the hash slot of the hash block, the link group including dirent pointers for hash values that are associated with the same hash slot; and
    locate the particular dirent slot using the dirent pointer.

13. A computer-readable storage medium containing program instructions for executing a file system operation for a computer system, wherein execution of the program instructions by one or more processors of a computer system causes the one or more processors to perform steps comprising:

receiving a file system operation request for a file system object at a file system of the computer system;

computing a hash value for a name of the file system object;

accessing a hash block of a file system directory stored in a storage system to locate a hash slot corresponding to the hash value;

locating a particular dirent slot from a plurality of dirent slots in a dirent block of the file system directory using at least one of a hash pointer in the hash slot and an allocation block of the file system directory that includes information to locate the particular dirent slot, the dirent slots being used to store dirents that contain storage information of file system objects stored in the storage system; and performing an operational task on the particular dirent slot of the dirent block to execute the file system operation.

14. The computer-readable storage medium of claim 13, wherein performing the operational task includes:

adding a new dirent into the particular dirent slot to create the file system object, the new dirent containing storage information of the file system object; and updating the hash slot with a new hash pointer pointing to the particular dirent slot.

15. The computer-readable storage medium of claim 14, further comprising:

if the hash slot has no entry, accessing the allocation block of the file system directory to locate the particular dirent slot, the allocation block including allocation entries that includes information regarding different blocks in the file system directory and any free slots in the different blocks;

after the new dirent has been added to the particular dirent slot, adding a new hash pointer to the hash block to point to the particular dirent slot.

16. The computer-readable storage medium of claim 14, further comprising:

if the hash slot has an entry pointing to a dirent slot, accessing the allocation block of the file system directory to locate a link group of a link block of the file system directory for the computed hash value;

updating the hash pointer in the hash slot to point to the link group;

adding links in the link group with dirent pointers that point to the dirent slot and to the particular dirent slot.

17. The computer-readable storage medium of claim 14, further comprising:

if the hash slot has an entry pointing to a link group of a link block of the file system directory, adding a new link to the link group accessing the allocation block of the file system directory with a dirent pointer that points to the particular dirent slot.

18. The computer-readable storage medium of claim 13, further comprising locating a dirent pointer in a link group of a link block of the file system directory that points to the particular dirent slot using the hash pointer in the hash slot of the hash block, the link group including dirent pointers for hash values that are associated with the same hash slot.

19. The computer-readable storage medium of claim 18, wherein performing the operational task includes reading a dirent in the particular dirent slot to access the file system object stored in the storage system, the dirent containing storage information of the file system object.

20. The computer-readable storage medium of claim 18, wherein performing the operational task includes:

deleting a dirent in the particular dirent slot to delete the file system object, the dirent containing storage information of the file system object; and removing the dirent pointer from the link group of the link group block.

* * * * *